(12) United States Patent
Magerl et al.

(10) Patent No.: US 7,046,031 B2
(45) Date of Patent: May 16, 2006

(54) METHOD FOR MONITORING AT LEAST TWO SWITCHING PATHS AND A SWITCHING CIRCUIT FOR SAFELY CONNECTING/DISCONNECTING A LOAD

(75) Inventors: Renate Magerl, Weisendorf (DE); Luca Silvio Rattaro, Erlangen (DE)

(73) Assignee: Siemens Aktiengesellschaft, München (DE)

( * ) Notice: Subject to any disclaimer, the term of this patent is extended or adjusted under 35 U.S.C. 154(b) by 10 days.

(21) Appl. No.: 10/871,497

(22) Filed: Jun. 18, 2004

(65) Prior Publication Data

US 2005/0035665 A1 Feb. 17, 2005

(30) Foreign Application Priority Data

Jun. 20, 2003 (DE) ................................ 103 27 959

(51) Int. Cl.
*G01R 31/36* (2006.01)
*B60L 15/12* (2006.01)
*G05B 19/25* (2006.01)

(52) U.S. Cl. .................. 324/771; 324/765; 324/158.1; 307/113; 318/545; 318/673

(58) Field of Classification Search ..................... None
See application file for complete search history.

(56) References Cited

U.S. PATENT DOCUMENTS

| 6,825,579 | B1* | 11/2004 | Ehrlich et al. | 307/113 |
| 2002/0130557 | A1* | 9/2002 | Dickhoff | 307/113 |
| 2002/0175568 | A1* | 11/2002 | Clement et al. | 307/326 |
| 2004/0155529 | A1* | 8/2004 | Brotto | 307/116 |

FOREIGN PATENT DOCUMENTS

DE 199 51 957 A1 10/2000

* cited by examiner

*Primary Examiner*—Vinh Nguyen
*Assistant Examiner*—Emily Y Chan
(74) *Attorney, Agent, or Firm*—Henry M. Feiereisen

(57) ABSTRACT

A method for monitoring switching paths that can safely connect a load with a supply voltage and safely disconnect the load from the supply voltage, and a switching circuit using the method are described. The load can be connected via at least two switching paths with one or more supply voltages, wherein electric power is applied to the load only if the load is connected with the supply voltage(s) via the two or more switching paths. To monitor that the load properly disconnected from the supply voltage(s), a monitoring device measures for each of the switching paths a separate state signal and determines the functionality of the switching paths based on the measured state signals.

13 Claims, 1 Drawing Sheet

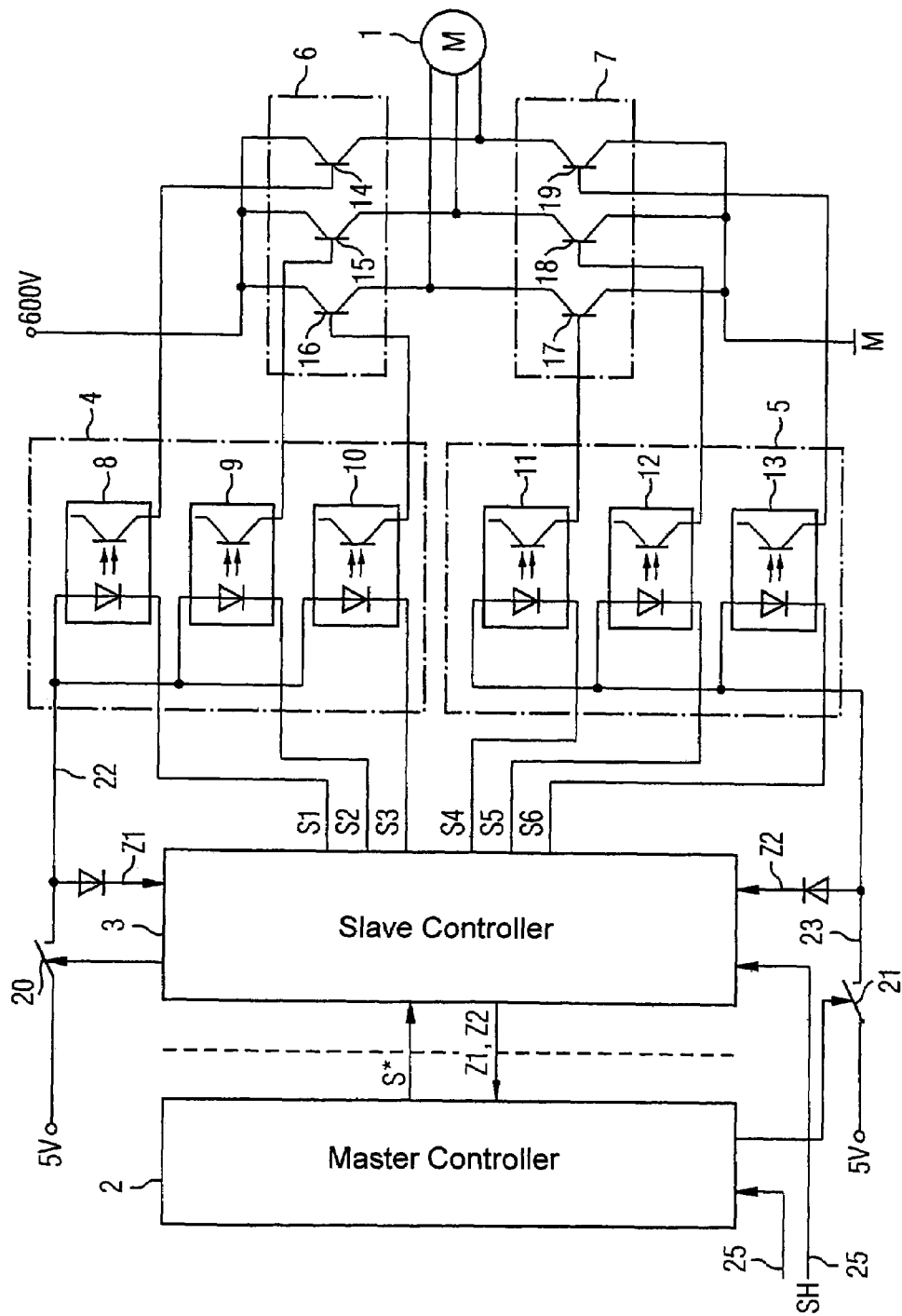

METHOD FOR MONITORING AT LEAST TWO SWITCHING PATHS AND A SWITCHING CIRCUIT FOR SAFELY CONNECTING/DISCONNECTING A LOAD

CROSS-REFERENCES TO RELATED APPLICATIONS

This application claims the priority of German Patent Application, Serial No. 103 27 959.8, filed Jun. 20, 2003, pursuant to 35 U.S.C. 119(a)–(d), the disclosure of which is incorporated herein by reference.

BACKGROUND OF THE INVENTION

The present invention relates to a method for monitoring switching paths that can safely connect a load with a supply voltage and safely disconnect the load from the supply voltage, as well as to a switching circuit for safely connecting and disconnecting the load.

For safely connecting a load to and disconnecting a load from a supply voltage or supply voltages, at least two switching paths must be provided, wherein electric power should be supplied to the load only if the load is connected to the supply voltage or voltages through both switching paths. For example, the load of machine tools, production machines and other electrical machines is generally disconnected from all supply voltages simultaneously, which is typically referred to as "Safe Stop."

The switching paths must be tested from time to time to ensure their proper operation. Safety standards and agency regulations for electric and electronic systems therefore require periodic tests, for example, every couple of hours, for example every eight hours.

Conventional systems and methods, such as described, for example, in German patent publication no. DE 199 51 957 A1, involve testing of the operation of the switching paths by polling the status of the switching paths sequentially, i.e. with a time offset. A monitoring device measures a (single) state signal, based on which the monitoring device determines the functionality of the switching paths. This conventional method suffers shortcomings because the required time offset between the switching paths increases the switching circuit complexity as a consequence of the need for additional and/or more complex switching circuit components. In addition, assurances must be taken to specify the order in which the switching circuits are addressed.

It would therefore be desirable and advantageous to provide an improved method and a corresponding switching circuit for monitoring switching paths that connect a load to a supply voltage and disconnect the load from the supply voltage, which obviates prior art shortcomings and can be implemented without requiring additional and/or more complex switching circuitry.

SUMMARY OF THE INVENTION

According to one aspect of the present invention, a method for monitoring at least two switching paths that connect a load to a supply voltage, includes the steps of providing a monitoring device for measuring for each of the switching paths a separate state signal, determining a functionality of the switching paths based on the measured state signals, and supplying electric power to the load only if the determined functionality indicates that the load is connected to the supply voltage via the at least two switching paths.

According to another aspect of the invention, a switching circuit for connecting a load to a supply voltage and disconnecting a load from a supply voltage includes at least two switching paths configured to connect the load to the supply voltage. Electric power is supplied to the load only if the load is connected to the supply voltage by the at least two switching paths. A monitoring device measures for each of the switching paths a corresponding state signal, wherein a functionality of the switching paths is determined based on the measured state signals.

According to another feature of the present invention, each of the switching paths may include a control device, whereby each control device controls a corresponding switching circuit. It is determined from the measured state signals if a control device applies the control signal to the corresponding switching circuit, and electric power is supplied to the load only if the measured state signals indicate that the control signals are applied to the corresponding switching circuit. In this case, the measured state signals include exclusively low voltage signals, thus avoiding transmission of high voltage signals.

According to another feature of the present invention, determination may be made from the measured state signals if the switching circuits receive electric power. The control devices apply the control signals to the switching circuits only if the measured state signals indicate that the switching circuits receive electric power.

According to another feature of the present invention, a disconnect signal may be simultaneously supplied to separate controllers of the monitoring device for disconnecting the load from the supply voltage, with each of the controllers addressing a corresponding one of the switching paths. The controllers check based on the measured state signal for each of the switching paths if the load is simultaneously disconnected from the supply voltage. In the context of the present invention, the expression "simultaneously" is meant to indicate that the disconnect command is applied to both controllers within a preset or presettable first time interval of, for example, between 0.3 and 0.7 seconds, and that the load is disconnected from the supply voltages within a (slightly longer) preset or presettable second time interval of, for example, between 0.5 and 1.0 seconds.

According to another feature of the present invention, the controllers may be arranged in a master-slave configuration, wherein the master controller sets for the slave controller a desired operating state of the load, for example, a rotation speed, a torque or an electric current of the load, and the slave controller determines the control signals based on a desired operating state and outputs the control signals via the control devices to the switching circuits. In this way, the switching paths can be controlled during a safe disconnect by switching circuit components that typically are already a part of the conventional machine for controlling and operating the load. The monitoring device and the master-slave controllers can be implemented as one and the same device. Alternatively, the master-slave controllers can also be two separate or separable components.

According to another aspect of the present invention, a switching circuit for connecting a load to a supply voltage and disconnecting a load from the supply voltage includes at least two switching paths capable of connecting the load to the supply voltage, wherein electric power is supplied to the load only if the load is connected to the supply voltage by the at least two switching paths, and a monitoring device for measuring for each of the switching paths a corresponding state signal, wherein a functionality of the switching paths is determined based on the measured state signals

BRIEF DESCRIPTION OF THE DRAWING

Other features and advantages of the present invention will be more readily apparent upon reading the following description of currently preferred exemplified embodiments of the invention with reference to the accompanying drawing, in which the only FIGURE shows a switching circuit diagram according to the invention for safely connecting and disconnecting a load.

DETAILED DESCRIPTION OF PREFERRED EMBODIMENTS

The depicted embodiment is to be understood as illustrative of the invention and not as limiting in any way. Certain details which are not necessary for an understanding of the present invention or which render other details difficult to perceive may have been omitted.

Turning now to the FIGURE, there is shown an exemplary switching circuit for safely connecting and disconnecting a load 1 which includes a monitoring circuit that has two controllers 2, 3, with one of the controllers configured as a master controller 2 and the other controller as a slave controller 3. The exemplary controllers 2, 3 can be separate components 2, 3, as indicated in the FIGURE by a dashed line. With the exception of the depicted connection of the two controllers 2, 3 in a master/slave configuration, the units otherwise operate independent of each other.

The switching circuit further includes two control devices 4, 5 and two corresponding switching circuits 6, 7. A first control device 4 is operatively connected to a first of the two switching circuits 6, whereas the second control device 5 is operatively connected to the second switching circuit 7. Each of the control devices 4, 5 in conjunction with the corresponding switching circuits 6, 7 forms a separate switching path capable of connecting the load 1 with supply voltages, in the depicted example with 600 V and ground.

As shown in the FIGURE, each of the control devices 4, 5 includes three opto-couplers 8 to 13, whereas each of the switching circuits 6, 7 includes three electronic power switches 14 to 19. The slave controller 3 can address the power switches 14 to 19 via the opto-couplers 8 to 13 which provide galvanic isolation between the slave controller 3 and the corresponding electronic power switches. The power switches 14 to 19 can be implemented, for example, as power transistors.

The switching circuits 6, 7 are therefore configured as switched electronic power circuits 6, 7. In addition, a three-phase current can be applied to the load 1 by suitably addressing the power switches 14 to 19 via the opto-couplers 8 to 13. It can be seen that power can be applied to the load 1 only if at least one power switch 14 to 16 of the upper switching circuit 6 and at least one power switch 17 to 19 of the lower switching circuit 7 is conducting, i.e., the load is connected to the supply voltage(s) via both switching paths.

The switching paths are configured so that power is supplied to the load 1 only if the slave controller 3 supplies control signals S1 to S6 to the power switches 14 to 19 via the opto-couplers 8 to 13. In addition, the opto-couplers 8 to 13 can supply the control signals S1 to S6 to the power switches 14 to 19 only, if an upper switch 20 and a lower switch 21 are closed simultaneously, i.e., if the control devices 4, 5 receive electric power via lines 22, 23.

The slave controller 3 determines the control signals S1 to S6 based on a desired operating state S* which the master controller 2 sets in the slave controller 3. The desired operating state S* can be, for example, a desired rotation speed, a desired torque or a desired current.

In order to monitor that the switching paths properly disconnect the load 1 from the supply voltage(s), the slave controller 3 measures a state signal Z1, Z2 for each of the switching paths. The state signals Z1, Z2 correspond to the potentials on the lines 22, 23. The measured state signals Z1, Z2 are therefore indicative of the power supply states of the controllers 4, 5. They therefore also indicate if the controllers 4, 5 are capable of outputting the control signals S1 to S6 to the switching devices 6, 7. The slave controller 3 can therefore use the state signals Z1, Z2 to check the functionality of the switching paths. Likewise, the slave controller 3 can also check if the load 1 is simultaneously disconnected from the supply voltage(s).

The proper operation of the switching path can be monitored by simultaneously supplying a disconnect command SH to the controllers 2, 3 via lines 25 which causes the load 1 to be disconnected from the supply voltages. The master controller 2 then opens the lower switch 21, while the slave controller 3 opens the upper switch 20. Each of the controllers 2, 3 therefore controls a separate switching path.

The slave controller 3 transmits the measured state signals Z1, Z2 to the master controller 2. The master controller 2 can then perform the same checks as the slave controller 3. Both controllers 2, 3 therefore operate in accordance with the present invention as the monitoring device.

The monitoring method according to the present invention can thus easily measure the operation of the switching paths based on the measured state signals Z1, Z2.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A method for monitoring at least two switching paths that connect a load to a supply voltage, comprising the steps of:
    providing a monitoring device operatively connected to the switching paths for measuring for each of the switching paths a separate state signal;
    determining a functionality of the switching paths based on the measured state signals;
    supplying electric power to the load only if the determined functionality indicates that the load is connected to the supply voltage via the at least two switching paths; and
    supplying a disconnect signal simultaneously to separate controllers of the monitoring device for disconnecting the load from the supply voltage, wherein each of the controllers addresses a corresponding one of the switching paths, and the controllers check based on the measured state signal for each of the switching paths if the load is simultaneously disconnected from the supply voltage.

2. The method of claim 1, further comprising the steps of determining from the measured state signals if a control device applies the control signal to the corresponding switching circuit; and supplying the electric power to the load only if the measured state signals indicate that the control signals are applied to the switching circuit.

3. The method of claim 2, further comprising the steps of determining from the measured state signals if the switching circuits receive electric power; and causing the control devices to apply the control signals to the switching circuits only if the measured state signals indicate that the switching circuits receive electric power.

4. The method of claim 1, wherein the controllers are arranged in a master-slave configuration, wherein the master controller sets for the slave controller a desired operating state of the load, and wherein the slave controller determines the control signals based on a desired operating state and outputs the control signals via the control devices to the switching circuits.

5. The method of claim 4, wherein the desired operating state is selected from a rotation speed, a torque or an electric current of the load.

6. A switching circuit for connecting a load to a supply voltage and disconnecting a load from the supply voltage, comprising:
   at least two switching paths capable of connecting the load to the supply voltage, wherein electric power is supplied to the load only if the load is connected to the supply voltage by the at least two switching paths; and
   a monitoring device having two mutually independent control devices controlling a corresponding one of the switching paths and measuring for each of the switching paths a corresponding state signal, said measured state signals indicating a functionality of the switching paths,
   wherein a disconnect signal is applied simultaneously to the mutually independent control devices for disconnecting the load from the supply voltages, and wherein the control devices check based on the measured state signals if the load is simultaneously disconnected from the supply voltages.

7. The switching circuit of claim 6, wherein each of the at least two switching paths includes a corresponding switching circuit controlled by a corresponding one of the control devices, wherein electric power is supplied to the load only if each of the control devices supplies a control signal to the corresponding switching circuit, and wherein the measured state signals from each of the switching paths indicate if the control device supplies the control signal to the corresponding switching circuit.

8. The switching circuit of claim 7, wherein the measured state signal from each of the switching paths indicates when the electric power is supplied to the control devices, and wherein the control devices output the control signals to the corresponding switching circuits only if the electric power is supplied to the corresponding switching circuits.

9. The switching circuit of claim 6, wherein the switching circuit is an electronic power switching circuit.

10. A switching circuit, for connecting a load to a supply voltage and disconnecting a load from the supply voltage, comprising:
    at least two switching paths capable of connecting the load to the supply voltage, with each of the at least two switching paths including a corresponding control device and a switching circuit controlled by the corresponding control device; and
    a monitoring device operatively connected to the switching paths for measuring for each of the switching paths a corresponding state signal,
    said measured state signals indicating a functionality of the switching paths,
    wherein electric power is supplied to the load only if each of the control devices supplies a control signal to the corresponding switching circuit and if the load is connected to the supply voltage by the at least two switching paths,
    wherein electric power is supplied to the corresponding switching circuits only if the control devices output the control signals to the corresponding switching circuits, and
    wherein the measured state signals from each of the switching paths indicate if the control devices supply the control signal to the corresponding switching circuit and further indicate when the electric power is supplied to the control devices,
    wherein the controllers are configured as master-slave controllers, with the master controller setting for the slave controller a desired operating state of the load, and wherein the slave controller determines the control signals based on the desired operating state, and outputs the control signals via the control devices to the switching circuits.

11. The switching circuit of claim 10, wherein the monitoring device is identical with the master-slave controllers.

12. The switching circuit of claim 10, wherein the mutually independent controllers are configured as two separable components.

13. The switching circuit of claim 10, wherein the switching circuit is an electronic power switching circuit.

* * * * *